Nov. 28, 1939.  W. F. WEBER  2,181,387
STAPLING MACHINE CORE
Original Filed Aug. 27, 1934
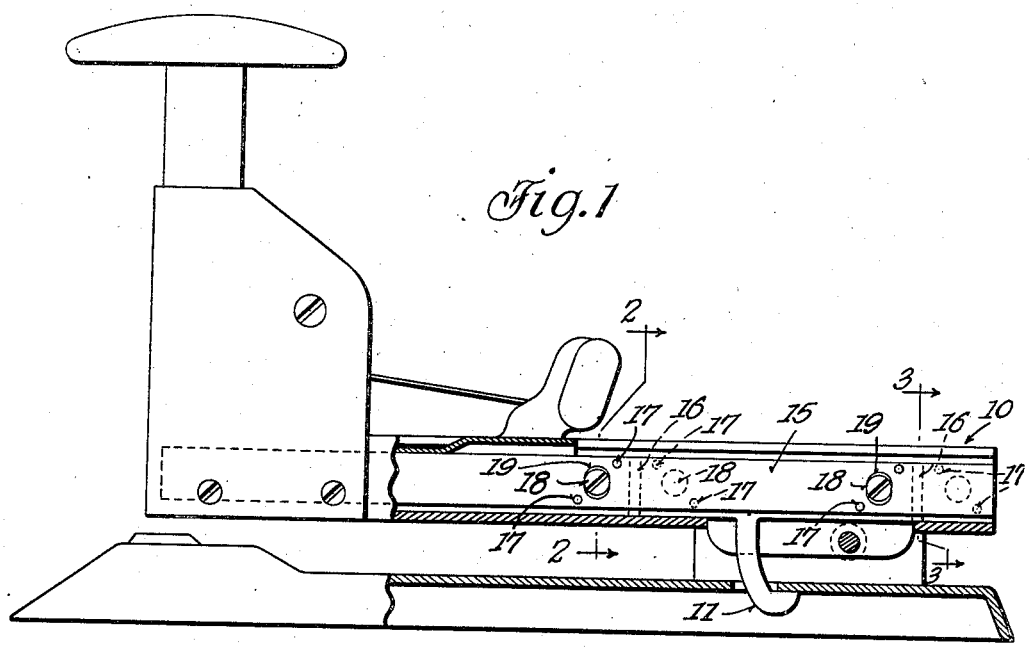
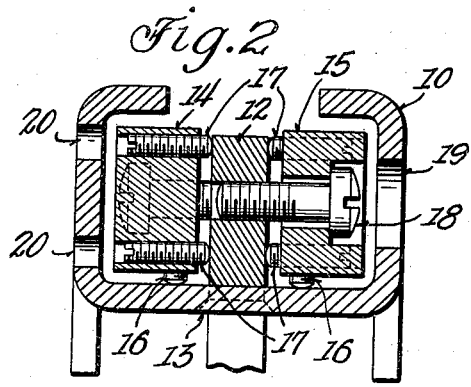
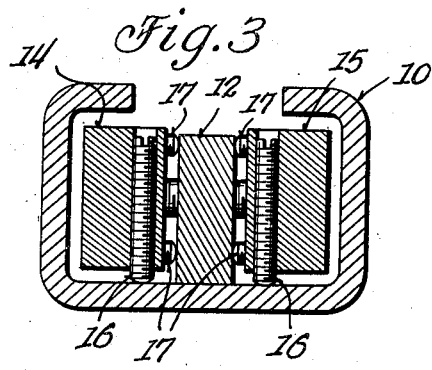
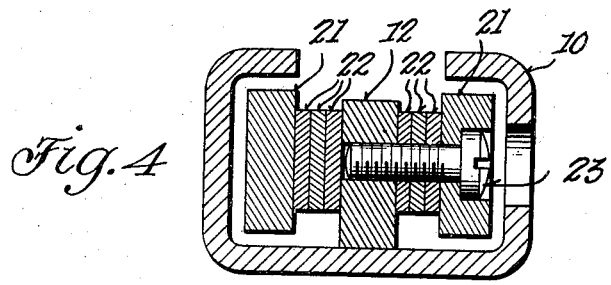
INVENTOR.
William F. Weber
BY John W. Michael
ATTORNEY.

Patented Nov. 28, 1939

2,181,387

UNITED STATES PATENT OFFICE 2,181,387

STAPLING MACHINE CORE

William F. Weber, Chicago, Ill.

Original application August 27, 1934, Serial No. 741,658. Divided and this application July 31, 1937, Serial No. 156,683

6 Claims. (Cl. 1—3)

The present invention has to do with the structure of a core or filler member for the beam of a stapling device and has particularly to do with a core which is adjustable to permit its use with staples of varying size.

The present application is a division of the copending application of William F. Weber, applicant herein, Serial No. 741,658, filed August 27, 1934, for Stapling machine core, which application is directed to and claims a core fabricated from a number of preformed laminations.

The object of this invention is to provide a unique magazine for a stapling machine comprising a core of laminated material, and having adjusting means to vary the spacing of the laminations so that the core is adaptable for use with staples of varying size.

This object, and other objects as may hereinafter appear, are obtained by the novel construction, unique arrangement and improved combination of the several elements which constitute the several embodiments of the invention illustrated in the accompanying sheet of drawings, hereby made a part of this specification, and in which:

Figure 1 is a side elevation, partly in vertical section, of a stapling machine in which the laminated adjustable cores hereinafter described may be used;

Figure 2 is an enlarged transverse section of the core shown in Figure 1, and taken on line 2—2;

Figure 3 is another enlarged transverse section of the core shown in Figures 1 and 2, and is taken on line 3—3 of Figure 1; and Figure 4 is a transverse section of a modification of the core shown in Figures 1 to 3 inclusive.

Like reference characters are used to designate similar parts in the drawing and in the description of the invention which follows.

In all forms of the laminated adjustable core, there is a member 10 having a bottom and vertical parallel sides with inturned flanges extending about the members comprising the core. This member or magazine casing 10 may be made in a variety of ways as is known to those skilled in the art. The spacing between the interior walls of member 10 and the core is such that the runway formed therebetween readily receives staples. The width of the runway is such that staples may not be displaced from such runway so as to pile upon one another or become otherwise disarranged.

A riser 11 may be employed with the structures shown. Preferably the riser should be in the center of the core but a position to either side of the center is permissible with concurrent alteration of the associated structure and position of the limiting member against which the riser impinges to limit angular separation of the base and riser. The riser is illustrated and claimed in Patent No. 2,087,779 issued July 20, 1937, to William G. Pankonin.

The core comprises a rib 12 riveted or otherwise fastened at 13 at spaced intervals therealong, to the bottom of member 10, and side laminations 14 and 15. The side members are each independently mounted for movement toward and away from the center rib 12 and vertically toward or away from the floor or bottom of member 10.

For the vertical adjustment just described, adjusting screws 16 extend through the members 14 and 15. For movement toward and away from the center rib 12, adjusting screws 17 are arranged transverse of the side members 14 and 15. To maintain adjustments of adjusting screws 17, locking screws 18 are employed. Oblong clearance holes 19 and oversize clearance holes 20 are provided in the sides of member 10 for access respectively to the locking screws 18 and adjusting screws 17.

As many of such adjusting screws 16 and 17 as are necessary are disposed along the side members 14 and 15. There is generally enough play between the side members and the rib 12 and the side members and the bottom of the member 10 not to produce undue strains upon the several adjusting screws during the adjustments necessary to correctly center the core members within the channel.

If desired, the core may be made of strips 21 and collars or washers 22. Screws 23 are threaded into (or through) the rib 12. Such screws 23 (of which only one is shown) support the side pieces or strips 21 which are spaced from rib 12 by washers 22 which circle the shanks of screws 23. Staples ride upon the core just described with the ends of their bridges upon the narrow edges of strips 21, and the legs of the staples parallel to and alongside the wide faces of such strips. The adjustment is lateral only and is made by varying the number and/or thickness of the collars 22 inserted on the screws 23.

The invention claimed is:

1. In combination in a beam magazine for a stapling device, an external member for preventing displacement for staples, an internal member upon which the staples ride, and means for adjusting the spacing between said members.

2. A staple magazine for preformed staples comprising a core and staple retaining members spaced from said core, said core consisting of vertical laminations of material upon which staples ride in straddle fashion, the depending legs of said staples including said laminations therebetween, the outer of said laminations having their upper edges extending beyond the upper edges of the other laminations.

3. A staple magazine for preformed staples comprising an outer casing, a rib located centrally within said casing, and laminations adjustably secured to said rib to form support for staples in said magazine.

4. A staple magazine comprising members upon which staples ride in straddle fashion, an outer guide for maintaining the staples on said members, and means for adjustably supporting said members in positions variably laterally spaced from said guide.

5. A staple magazine comprising members upon which staples ride in straddle fashion, an outer guide for maintaining the staples on said members, and means including adjusting and locking screws for adjustably supporting said members in positions variably laterally spaced from said guide.

6. A staple magazine for preformed staples comprising an outer casing, a rib located within said casing, laminations adjacent said rib and forming a support for staples, adjusting screws acting between said laminations and said rib and between said laminations and the bottom of said casing to adjust the relative position of said laminations and said casing, locking screws for holding said laminations in position, and apertures in said casing providing access to said adjusting screws.

WILLIAM F. WEBER.